United States Patent [19]
Guest

[11] Patent Number: 5,490,346
[45] Date of Patent: Feb. 13, 1996

[54] FISHHOOK DEVICES AND ASSEMBLAGES OF PARTS THEREFOR

[75] Inventor: John R. Guest, 34 Forest Street, Aylmer, Quebec, Canada, J9H 4E6

[73] Assignees: John Robert Guest; Brian Bradfield

[21] Appl. No.: 271,937

[22] Filed: Jul. 8, 1994

[51] Int. Cl.⁶ .................................................. A01K 85/02
[52] U.S. Cl. .................... 43/42.4; 43/42.24; 43/42.52; 43/42.09
[58] Field of Search ........................ 43/42.1, 42.4, 43/42.41, 42.42, 42.43, 42.09, 42.24, 42.26, 42.37, 42.38, 42.52, 35, 36

[56] References Cited

U.S. PATENT DOCUMENTS

| | | | |
|---|---|---|---|
| 2,419,295 | 4/1947 | Slough | 43/37 |
| 2,443,753 | 6/1948 | Tusa | 43/42.41 |
| 2,569,119 | 9/1951 | Tallaksen | 43/42.41 |
| 2,586,162 | 2/1952 | Hayden | 43/43.2 |
| 2,917,860 | 12/1959 | Norton | 43/43.2 |
| 3,019,544 | 2/1962 | Hummel | 43/42.41 |
| 3,091,884 | 6/1963 | Brownstein | 43/42.09 |
| 3,727,340 | 4/1973 | Harris | 43/43.2 |
| 4,384,426 | 5/1983 | Steeve | 43/43.4 |

FOREIGN PATENT DOCUMENTS

| | | |
|---|---|---|
| 48873 | 5/1895 | Canada . |
| 60075 | 2/1898 | Canada . |
| 195067 | 12/1919 | Canada . |
| 1045380 | 1/1979 | Canada . |
| 2076957 | 9/1991 | Canada . |
| 309127 | 11/1929 | United Kingdom ........ 43/42.4 |

*Primary Examiner*—P. Austin Bradley
*Assistant Examiner*—Jeanne M. Elpel
*Attorney, Agent, or Firm*—Thomas Adams

[57] ABSTRACT

A fishhook device comprises a hook unit and a lure member releasably fastened together. The hook unit comprises a first arm having a first hook at one end and a releasable fastener part at its opposite end, and a second arm with second and third hooks at one end and its other end portion joined to the first arm. The hooks each comprise a point and a curved portion. The curved portions of the second and third hooks diverge, one to each side of a longitudinal axis of the unit, and curve towards the second arm. The first hook curves towards the second arm in a plane through the longitudinal axis. The lure member has a second releasable fastener part and a loop spaced apart along the longitudinal axis. The second arm is releasably fastened to the lure member by cooperation of the first and second releasable fastener parts and by extension of the second arm through the loop. The second arm is movable from a first position, in which the two arms are apart and the points of the hooks are shielded from entanglement with weeds, to a second position, in which the arms are together and the points of the hooks project clear of the lure to snag a fish having its jaws clamped around the unit. The lure member may be a plate or "spoon". Alternatively, the lure member may be a bait replica of plastics material, perhaps shaped as a frog, and attached to the hook unit by means of a plate member provided with an appropriate second releasable fastener part. In the latter case, the plate may have a tang which is inserted into the body of the replica. In the first position, the point of the first hook is shielded by the second and third hooks and the points of the second and third hooks are shielded by the body of the bait replica. In the second or actuated position, the hooks protrude clear of the body. In the case of a frog-shaped lure member, the hooks conveniently protrude between the legs of the frog.

21 Claims, 5 Drawing Sheets

FISHHOOK DEVICES AND ASSEMBLAGES OF PARTS THEREFOR

The invention relates to fishhook devices and to sets of parts for assembling them. The invention is especially applicable to so-called weedless or snagfree fishhook devices.

BACKGROUND ART

It is known to provide a fishhook with a guard member to reduce the risk of the hook getting snagged by weeds or other submerged vegetation. U.S. Pat. Nos. 2,586,162 and 2,917,860 disclose fishhooks comprising a single hook with a weed guard which shields the point of the hook. When the fish strikes, the weed guard is displaced, allowing the hook to snare the fish.

It is desirable for a fishhook to have more than one hook to increase the likelihood of catching the fish. Canadian patents Nos. 69,081, 80,747, 230,171, 1,045,380 and 2,076,957, for example, disclose fishhooks comprising two opposed hooks which are held in a "closed" position until the fish strikes. Once the fish has struck, the hooks are urged apart inside the fish's mouth, at least partly due to the force applied to the fishing line. A weedless or snagfree construction can be achieved by opposing the two hooks so that, in the closed position, the point of each hook is shielded by a part of the other hook.

The likelihood of catching a fish may also be enhanced by the use of lures, such as pieces of highly reflective and/or brightly coloured pieces of metal or plastics material combined with the hook. In view of the cost, it is even more desirable to ensure that they are not lost in weeds. Thus, U.S. Pat. Nos. 2,419,295 and 3,019,544 disclose "weedfree" fishing lures. The fishing lure disclosed in U.S. Pat. No. 2,419,295 comprises a solid body of wood or plastic with a pair of opposed hooks attached to it. The shank of one hook is fixed to the body so that the hook protrudes beyond the end of the body. The other hook is pivotally attached and normally held away from the first hook by the combined effect of a small weight and a spring. In this position, the point of each hook is shielded by the curved portion of the shank of the other hook. As the mouth of the fish closes onto the shanks, the two hooks are urged apart and snag the fish. This device is not entirely satisfactory because it has only two hooks which are not readily detachable for use with a different lure member.

The fishing lure disclosed in U.S. Pat. No. 3,019,544 comprises a so-called "spoon" lure member which has a ring at one end for attachment to the fishing line. Two hooks are mounted to one end of a leaf spring, the other end of which is clipped into a bracket which is fastened to the spoon. The bracket is configured so that the spring arm is angled away from the spoon. The hooks curve away from each other but towards the spoon. Their points lie in respective notches in the end of the spoon and are urged into the notches by the spring action. With a view to avoiding undue delay in fleeing the hook from the mouth of the fish, which could allow a passing shoal of fish to get out of range before the angler makes his next cast, the leaf spring is releasably locked to the spoon allowing the leaf spring and hook to be released quickly and another leaf spring and hook attached to the spoon. This device is not entirely satisfactory because attachment of the leaf spring to the spoon is complicated, involving slots in the bracket both to embrace a waisted part of the leaf spring and to allow one end of the leaf spring to abut the spoon. The waisted part is formed by tapering in two dimensions, which is difficult. Moreover, the configuration is unsuitable for use with soft flexible lures and has only two hooks.

It is possible to construct a "weedless" fishhook with more than two hooks. U.S. Pat. No. 3,727,340 discloses a fishhook with two pairs of such opposed hooks, at right angles to each other, thus providing a weedless fishhook with four hooks, and U.S. Pat. No. 4,384,426 discloses weedless fishhooks with either three hooks in a triangular array or four hooks in a rectangular array. Neither of these fishhooks can readily be used with a lure, however, and they are relatively complicated and expensive to make.

SUMMARY OF THE INVENTION

The present invention seeks to eliminate, or at least mitigate, one or more of the disadvantages of the known fishing hooks and to provide an improved fishhook device. One object of the invention is to provide a fishhook device which allows a single hook unit, with a plurality of hooks, to be used with different sizes and/or types of lure member.

According to one aspect of the present invention, there is provided a fishhook device comprising a hook unit and a lure member releasably fastened together, the hook unit comprising a first arm and a second arm joined together by a joint, the first arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the first arm, the third hook curving towards the first arm in a plane through the longitudinal axis such that, with the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member, the lure member having a loop positioned adjacent a trailing end thereof and a first releasable fastener part spaced longitudinally therefrom, the hook unit having a second releasable fastener part adjacent the joint, the hook unit and lure member being fastened together by extension of the second arm through the loop and by cooperation of the first and second releasable fastener parts.

The lure member may comprises a plate, for example a so-called "spoon", the first releasable fastener part comprise a staple member projecting from the plate on the same side as the loop, the second releasable fastener part comprise an extension member projecting from the joint, away from the arms, and through the staple member, and detent means be provided to prevent withdrawal of the extension member from the staple member.

According to a second aspect of the present invention, there is provided a fishhook device comprising a hook unit and a lure member releasably fastened together, the hook unit comprising a first arm and a second arm joined together by a joint, the first arm being resiliently pivotable about the joint between a first position in which the first arm extends at an acute angle to the second arm and a second position in which the arms are together, the first arm having a first hook at a distal end thereof and the second arm having a second hook at a distal end thereof, the hooks each comprising a point and a curved portion, the curved portions of the hooks curving towards each other in a plane through a longitudinal axis of the arms such that, with the arms in the first position, the point of the second hook is shielded by the first hook and the point of the first hook is shielded by the lure member and, with the arms in the second position, the point of the second hook projects clear of one side of the lure member and the point of the first hook projects clear of the opposite side of the lure member, the lure member having a loop and a first releasable fastener pan spaced apart longitudinally, the loop towards a trailing end of the lure member and the releasable fastener part towards a leading end of the lure member, the hook unit having a second releasable fastener part adjacent the joint, the hook unit and lure member being fastened together by extension of the second arm through the loop and by cooperation of the first and second releasable fastener parts.

According to a third aspect of the present invention, there is provided a fishhook device comprising a hook unit and a bait replica of plastics material fastened together by releasable fastener means having a first part and a second part, the bait replica being attached by means of an attachment member having the first releasable fastener part, the hook unit comprising a first arm and a second arm joined together by a joint, the first arm being resiliently pivotable about the joint between a first position in which the first arm extends at an acute angle to the second arm and a second position in which the arms are together, the first arm having a first hook at a distal end thereof and the second arm having a second hook at a distal end thereof, the hooks each comprising a point and a curved portion, the curved portions of the hooks curving towards each other in a plane through a longitudinal axis of the arms such that, with the arms in the first position, the point of the second hook is shielded by the first hook and the point of the first hook is shielded by the lure member and, with the arms in the second position, the point of the second hook projects clear of one side of the lure member and the point of the first hook projects clear of the opposite side of the lure member, the hook unit having the second releasable fastener part adjacent the joint.

According to yet another aspect of the invention, there is provided a fishhook assemblage comprising a hook unit and a plurality of lure members each releasably attachable to the hook unit, the hook unit comprising a first arm and a second arm joined together by a joint, the :first arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the first arm, the third hook curving towards the first arm in a plane through the longitudinal axis, the lure member having a loop and a first releasable fastener part spaced apart longitudinally, the loop towards a trailing end of the lure member and the releasable fastener part towards a leading end of the lure member, the hook unit having; a second releasable fastener part adjacent the joint, whereby the hook unit and lure member can be attached together by extension of the second arm through the loop and by cooperation of the first and second releasable fastener parts, such that, with the hook unit and lure assembled and the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member.

According to a still further aspect of the invention, there is provided a fishhook assemblage comprising a hook unit and a plurality of lure members in the form of bait replicas attachable, individually, by an attachment member to the hook unit, the hook unit comprising a first arm and a second arm joined together by a joint, the first arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the first arm, the third hook curving towards the first arm in a plane through the longitudinal axis, the attachment member having releasable fastener means for cooperating with the first releasable fastener part to fasten the attachment means to the hook unit such that, with the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member.

Various objects, features and advantages of the present invention will become more apparent from the following detailed description, taken in conjunction with the accompanying drawings, of preferred embodiments of the invention, which are described by way of example only.

DESCRIPTION OF PREFERRED EMBODIMENTS

Where appropriate, parts of the fishhook assembly shown in FIGS. 1 through 7 have the same reference numbers as corresponding parts of the fishhook assembly of FIGS. 8 through 13. Referring first to FIGS. 1 through 7, a fishhook assembly embodying the invention comprises a hook unit 10 releasably attached to a lure member 12 which is slightly curved and generally teardrop shaped, usually referred to as a "spoon". The hook unit 10 and the lure member 12 are shown separately in FIGS. 4 and 5, respectively. The hook unit 10 comprises a first arm 14 and a second arm 16 joined together by a spot welded joint 18. The second arm 16 is flared in the region of the joint 18, forming shoulders 20. An extension portion 22 of second arm 16 projects away from the shoulders 20 and joint 18 and has a slot 24 adjacent its end. The extension portion 22 and slot 24 comprise parts of a releasable fastening means fastening the second arm 16 to the spoon portion 12.

Figure 1:
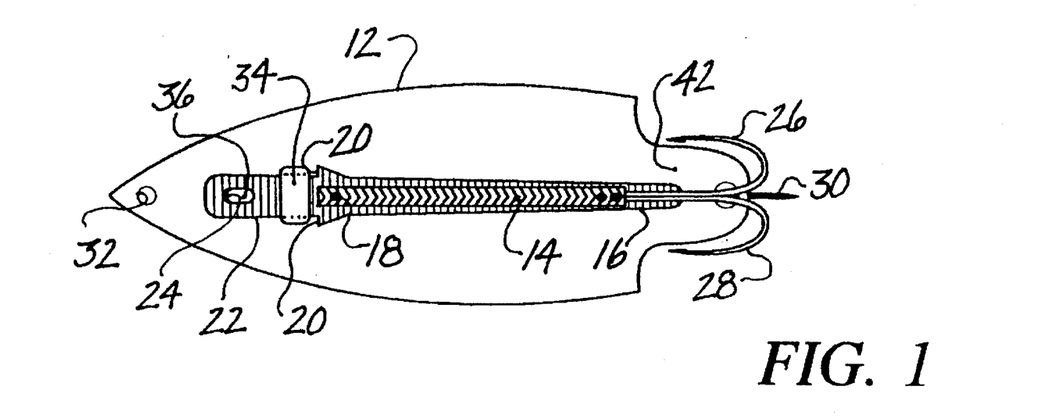
FIG. 1 is a plan view of a fishhook assembly according to a first embodiment of the invention comprising a hook unit attached to a spoon lure member.
Figure 5:
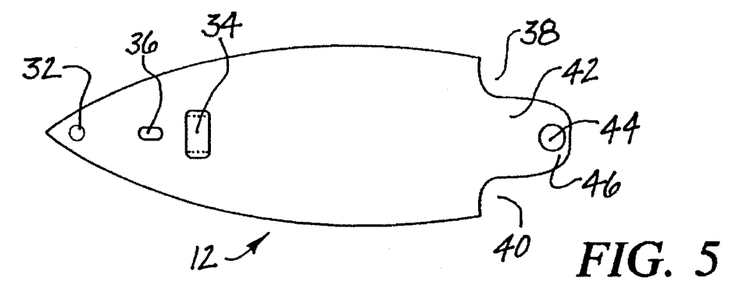
FIG. 5 is a plan view of the spoon alone.
Figure 6:
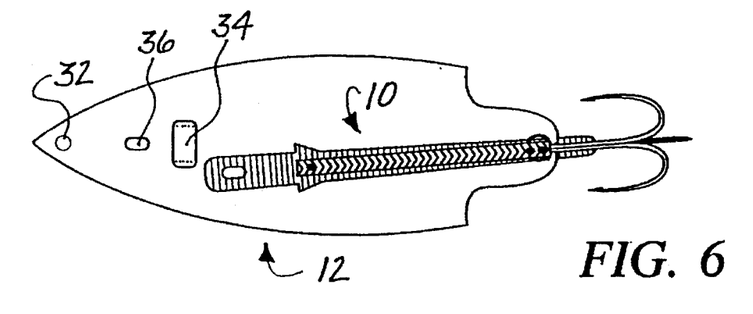
FIG. 6 is a plan view of the spoon and the hook unit in a state of partial assembly.

The lure member 12 is a plate of metal, plastics or other suitable material and, as shown in FIGS. 1, 5 and 6, has a pointed leading end with a hole 32 for attachment to a fishing line in the usual way by means of, for example, a swivel (not shown). A staple member 34 and detent 36 form complementary parts of the releasable fastening means to cooperate with the extension portion 22 and slot 24. The staple member 34 protrudes from that side of the spoon 12 shown uppermost in the drawings at a position intermediate the hole 32 and the middle of the spoon 12. The detent, in the form of a small protrusion 36, protrudes from the same side of the spoon 12 between the hole 32 and the staple member 34. The spoon 12 will usually be made by a stamping operation, in which case both the staple member 34 and the protrusion 36 may be formed during manufacture by slitting and offsetting parts of the spoon 12.

Figure 4:
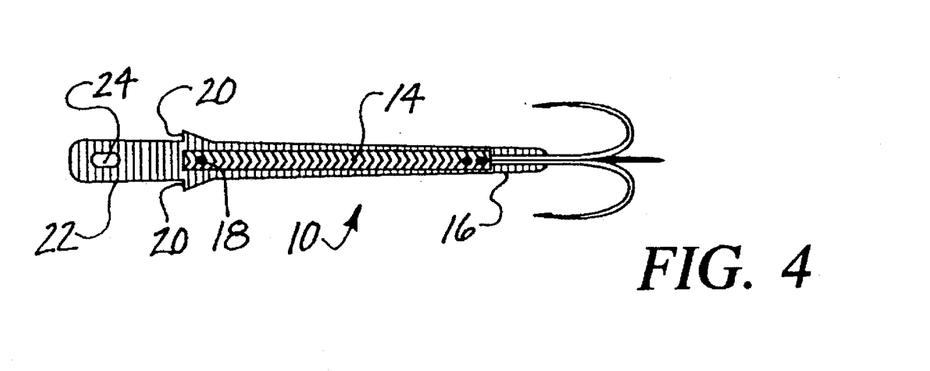
FIG. 4 is a plan view of the hook unit of FIG. 1, separated from the spoon.

The first arm 14 is of resilient material, for example a steel leaf spring, and bends away from the other arm 16, adjacent the joint 18, so that the arms 14 and 16 diverge at an acute angle relative to each other. Two hooks 26 and 28 attached to the distal end of first arm 14, conveniently welded, curve away from each other and inwardly towards the second arm 16. A single hook 30, slightly smaller than the hooks 26 and 28, is attached in a similar manner to the distal end of the second arm 16 and curves inwardly towards the first arm 14.

Figure 2:
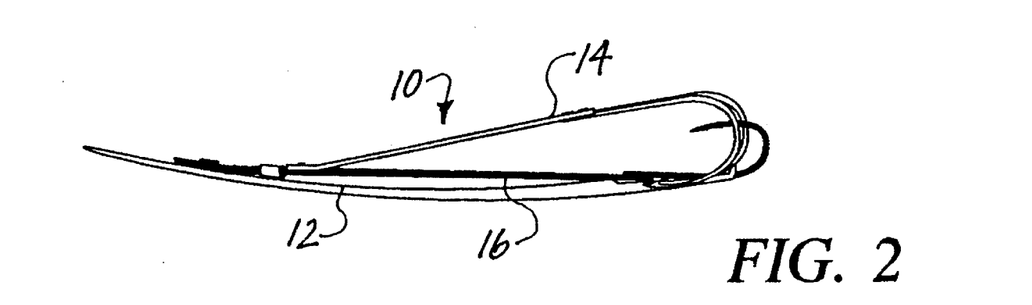
FIG. 2 is a corresponding side view with the hooks in a "closed" position.
Figure 3:
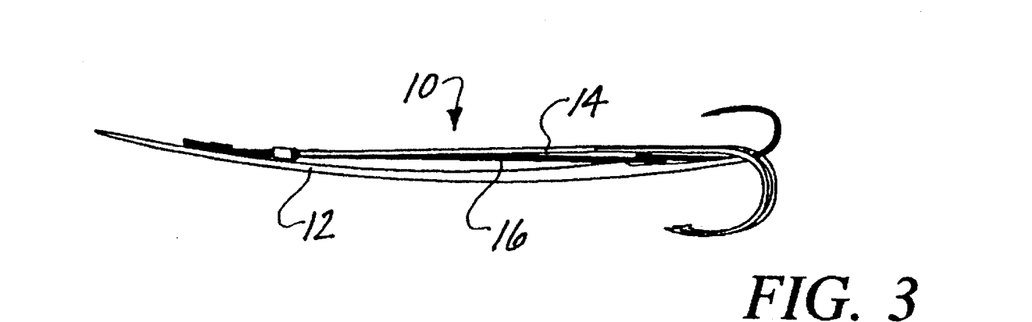
FIG. 3 is a corresponding side view with the hooks in an "open" position.

The trailing end portion of the spoon 12 has notches 38 and 40, respectively, in its opposite sides leaving a central tongue portion 42. A second hole 44 is positioned adjacent the end of the tongue portion 42. The strip of material between the hole 44 and the end of the tongue portion 42 bends away from the plane of the spoon 12 to form a loop 46 projecting outwardly from the same side as the staple 34. As shown in FIGS. 1 through 3, when the hook unit and the spoon are assembled, the curved part of single hook 30 extends through the loop 46 while the extension portion 22 extends through the staple 34. Protrusion 36 engages in the slot 24 to lock the releasable fastening and prevent withdrawal of extension portion 22 from staple 34.

In the "closed" position shown in FIG. 2, the arms 14 and 16 are normally apart and the points of the hooks 26, 28 and 30 are shielded so that they are unlikely to be snagged by weeds. The point of single hook 30 is shielded by the curved parts and shank of hooks 26 and 28. The points of the hooks 26 and 28 lie either side of tongue portion 42 and are shielded by the shoulders of the spoon 12 adjacent the notches 38 and 40. In use, when a fish clamps its jaws around the arms 14 and 16, they will be urged together to the "open" position shown in FIG. 3, exposing the points of the hooks 26, 28 and 30. The fish may then become hooked in the usual way.

The spoon 12 will usually be highly reflective and/or coloured to act as a lure for the fish. An angler may need to try several different spoons, with different shapes and/or colours, before finding one which will work for a particular kind of fish on a particular day, due perhaps to different environmental conditions and lighting. The manner in which the hook unit 10 is attached to the spoon 12 allows spoons 12 of different kinds to be exchanged quickly and easily. Spoons of different lengths can be used providing the releasable fastening parts on each spoon are spaced to cooperate with those on the hook unit.

Figure 7:
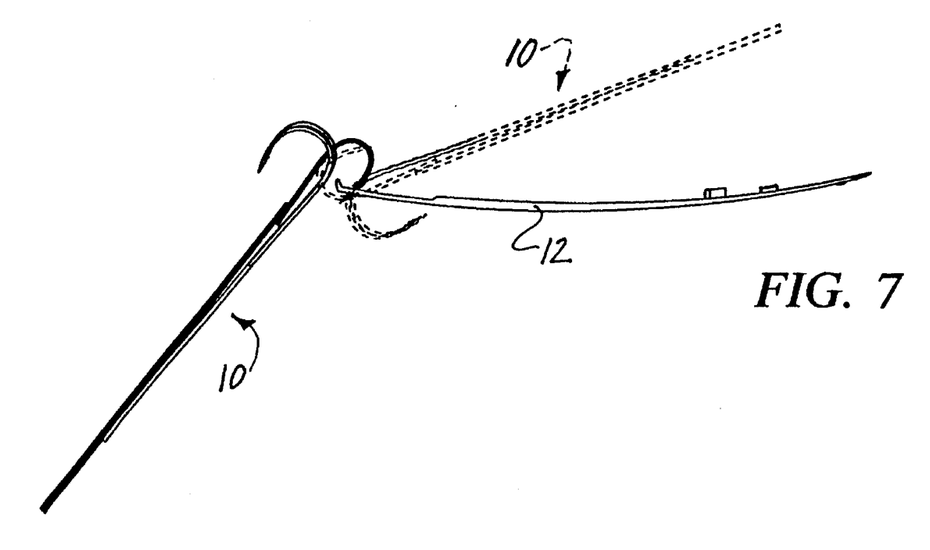
FIG. 7 is a side view illustrating steps in the assembly of the hook unit and the spoon.

To remove the hook unit 10, the angler pries the extension portion 22 away from the spoon 12 until projection 36 is clear of slot 24 and then slides the hook unit towards the trailing end of spoon 12 to withdraw the extension portion 22 from staple 34—as shown in FIG. 6. The angler then slides the hook unit 10 in the opposite direction and rotates it away from the spoon 12 to disengage single hook 30 from hole 44. To reassemble the device, the sequence is reversed. Thus, as illustrated in FIG. 7, the point of the single hook is inserted into hole 44 and the fishhook assembly rotated through about 180 degrees, through the position shown in broken lines in FIG. 7, until second arm 16 lies against the surface of spoon 12. The hook unit 10 then is slid towards the trailing end of the spoon 12, the extension portion 22 inserted through staple 34, and the hook unit 10 slid towards the leading end until the protrusion 36 engages in the slot 24. The extension portion 22 may be prised away from the spoon 12 slightly to allow it to ride over the protrusion 36. The protrusion 36 and/or end face of extension portion 22 could have inclined surfaces for the same purpose. The shoulders 20 of second arm 16 prevent over-insertion of the extension portion 22.

FIGS. 8 to 13 illustrate a second embodiment of the invention which employs a lure member 50 of synthetic plastics material, specifically a replica of a frog, and an attachment member in the form of a plate 52 which is shaped like an arrow head with a triangular head portion 54 and a relatively narrow tang 56. A hole 32, for attachment of the fishing line by means of a swivel, extends through the plate member 52 adjacent its point and a staple 34 and protrusion 36 are provided towards the broader end of the head portion 54. In use, the tang 56 is inserted into a pocket 58 from the underside of the frog body 50 (see FIG. 13). As shown, in FIGS. 9 and 10, the head of the frog lure 50 has a recess 60 in its underside to accommodate the head portion 54 of plate 52 and allow the tang 56 to enter the frog body portion close to its longitudinal center line. The pocket 58 may be preformed in the frog and sized so that the tang 56 is a suitable tight fit and will not easily be disengaged. Claws 62 project from the head portion 54, either side of the slot 36, to engage in the adjacent plastics material provide greater security.

Figure 8:
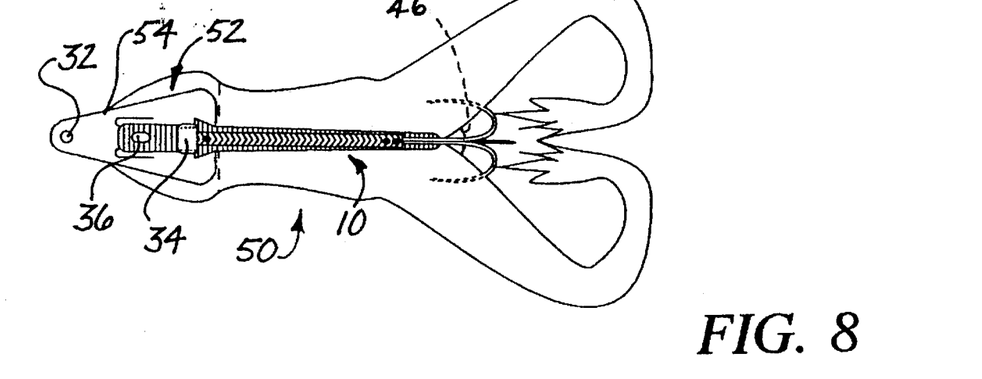
FIG. 8 is a plan view, from the underside, of a second embodiment of the invention which uses a lure in the form of a plastics bait replica shaped like a frog attached to a hook unit.
Figure 9:
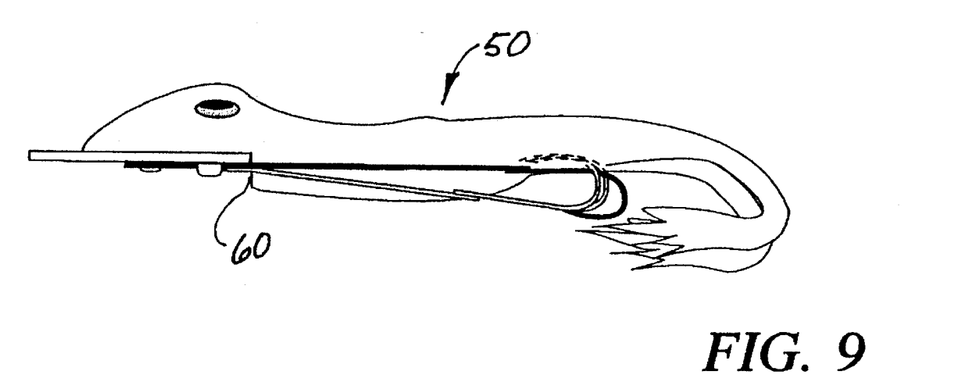
FIG. 9 is a corresponding side view showing the hooks in a "closed" position.

The hook unit 10 is attached to the plate 52 by inserting the extension portion 22 through the staple 34 and engaging the protrusion 36 in its slot 24. If desired, the single hook can be passed through a loop of the plastics material near the crotch of the frog's body. The loop may be formed by piercing the material with the hook 30.

Figure 10:
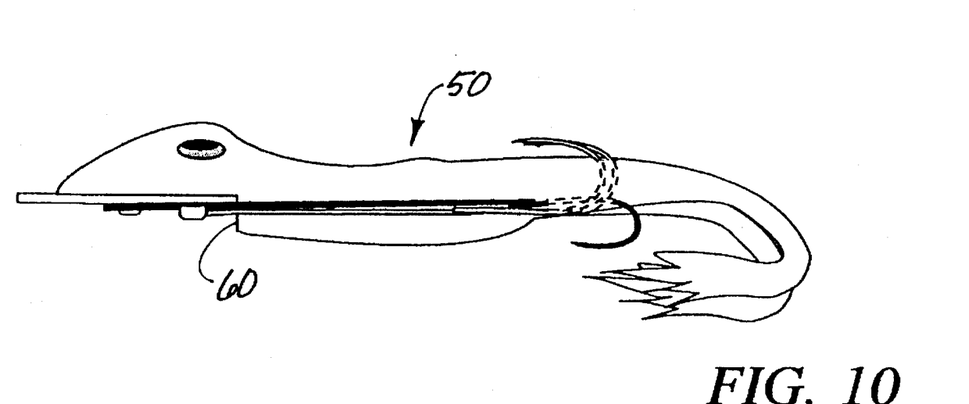
FIG. 10 is a corresponding side view showing the hooks in an "open" position.
Figure 11:
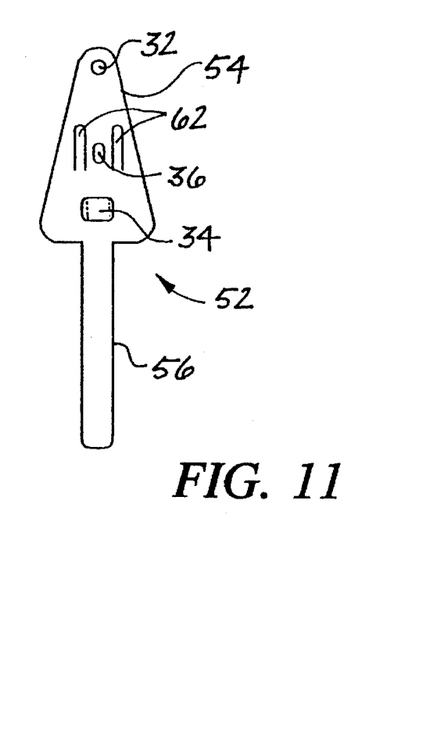
FIG. 11 is a plan view of an attachment member for securing the frog body to a hook unit.
Figure 12:
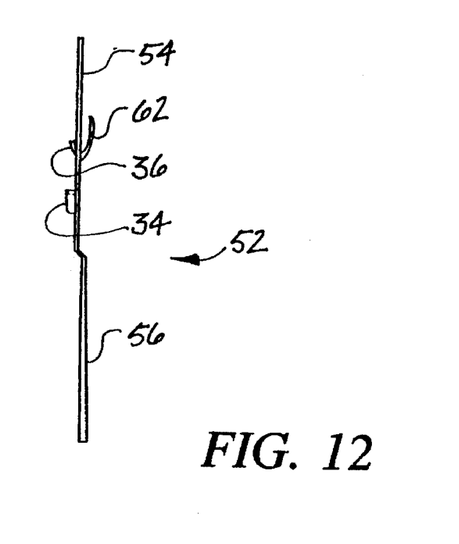
FIG. 12 is a side view of the attachment member.
Figure 13:
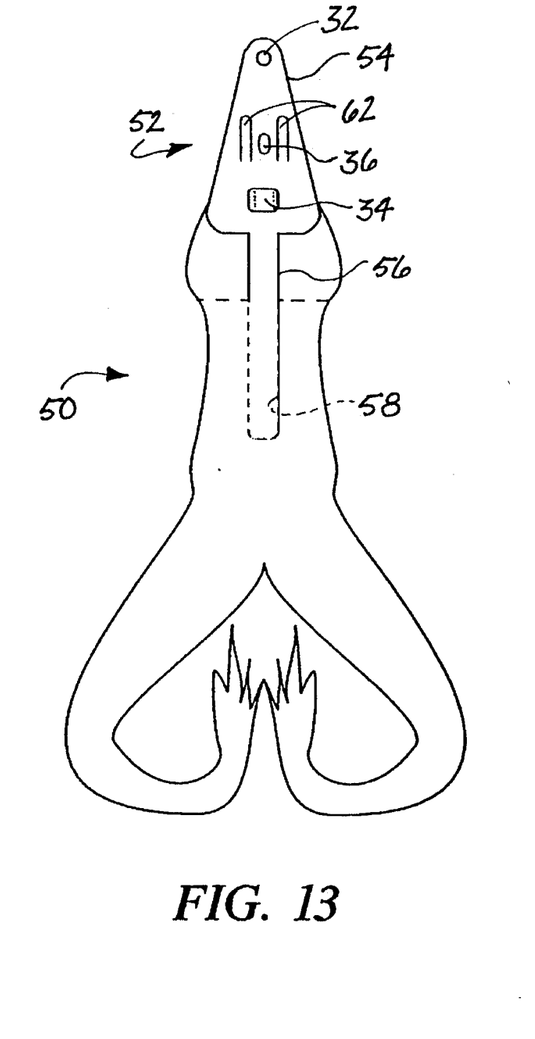
FIG. 13 illustrates attachment of the attachment member to the plastics frog.
Figure 14:
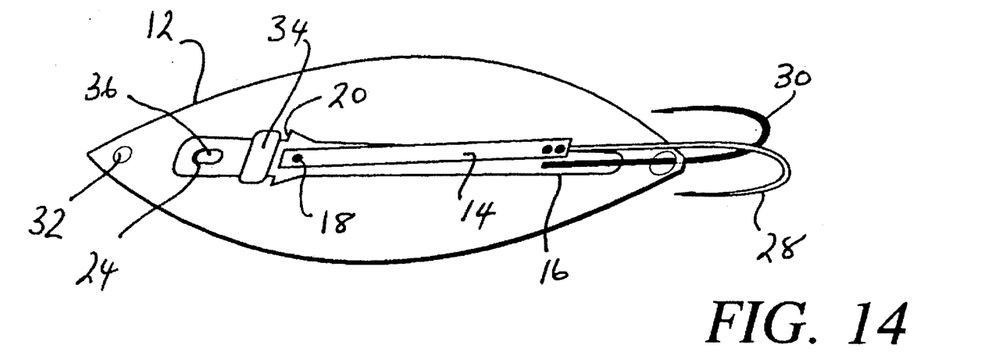
FIGS. 14, 15, 16 and 17 correspond to FIGS. 1, 2, 3 and 4 but show a fishhook assembly having only two hooks.
Figure 15:
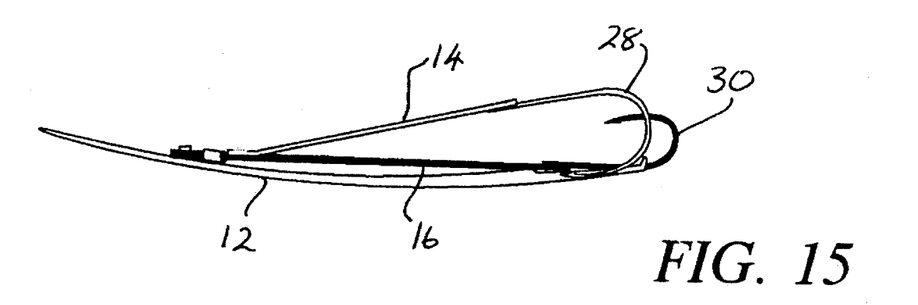
Figure 16:
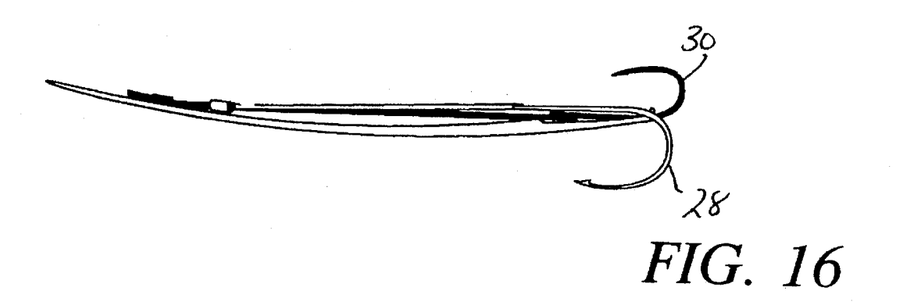
Figure 17:
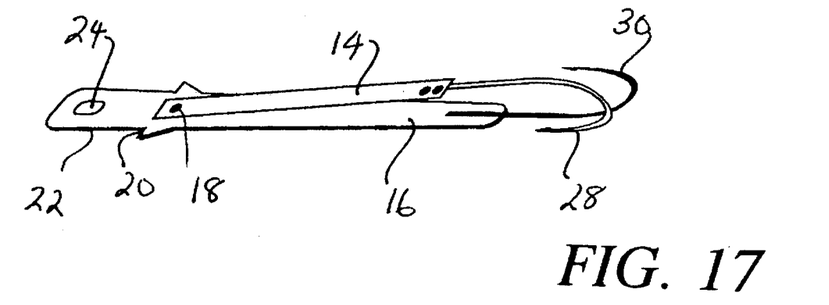

The distance from the mouth of pocket 58 to the crotch is such that, in the "closed" position, the points of the two hooks 26 and 28 extend between the legs with their points shielded from weeds by the frog's body. As before, the point of the single hook 30 is shielded by the double hooks 26 and 28. When the fish strikes, and clamps the arms 14 and 16 together, the hooks will be in the "open" position and will project clear of the frog's body, as shown in FIG. 10, to snag the mouth of the fish. It should be noted that the frog replica will be made of a plastics material which is so soft that the fish can compress it and clamp the arms 14 and 16 together.

The invention also embraces various modifications to the hook unit and lure members of the above-described specific embodiments. For example, the first arm 14, rather than second arm 16, could be flared to provide shoulders 20. The first arm 14 could have one hook rather than two. FIGS. 14 to 17 in which parts corresponding to parts of the fishhook assembly of FIGS. 1 to 4 have the same reference numbers. In this case, the notches in lure member 12 are unnecessary.

It is also envisaged that the tang 56 could be long enough to extend through the body and protrude, the protrusion being provided with a loop 46 to receive the hook in the manner previously described. Alternatively, a loop 46 could be formed into the plastics material itself. It is envisaged that, where the plastics material of the bait replica is sufficiently soft, the tang could be inserted without a preformed pocket. Alternatively, the plastics lure body may be formed around the plate member during manufacture i.e. the plate member would be a mould insert, in which case the narrow tang could be a different shape, or even omitted altogether.

It is envisaged that embodiments of the invention could be supplied as a set of parts enabling the angler to assemble several different kinds of lure as desired. Such a set could comprise a hook unit and one or more plates in the form of spoons, each having means for attaching it to the hook unit. Alternatively, a set could comprise a hook unit, at least one plastics bait replica, and an attachment plate member for attaching the fishhook assembly to the bait replica.

Spring-loaded "weed-free" hook units are relatively expensive, as compared with lure members such as spoons and plastics bait replicas. An advantage of embodiments of the invention is that they permit significant cost savings since the angler is able to use the same hook unit with a selection of interchangeable spoons and/or plastics bait replicas. It is envisaged that, over a period of time, an angler will be able to accumulate a range of interchangeable spoons and bait replicas, e.g. frogs, crayfish, worms, all compatible with the same fishhook assembly, for significantly less than the cost of the same number of individual lures/hook devices.

Although embodiments of the invention have been described and illustrated in detail, it is to be clearly understood that the same is by way of illustration and example only and is not to be taken by way of the limitation, the spirit and scope of the present invention being limited only by the appended claims.

What is claimed is:

1. A fishhook device comprising a hook unit and a lure member releasably fastened together, the hook unit comprising a first arm and a second arm joined together by a joint, one of the first arm and the second arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the second arm, the third hook curving towards the first arm in a plane through the longitudinal axis such that, with the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member, the lure member having a loop adjacent a trailing end of the lure member, the hook unit and lure member being fastened together by extension of the second arm through the loop and by interengagement of a part of the hook unit adjacent said joint and a part of the lure member spaced from the loop towards a leading end of the lure member, the hook unit being detachable as a unit from the lure member.

2. A fishhook device as claimed in claim 1, wherein the lure member comprises a plate, the lure member part comprising a staple member projecting from the plate on the same side as the hook unit, the hook unit part comprising an extension member projecting from the joint, away from the arms, and through the staple member, detent means being provided to prevent withdrawal of the extension member from the staple member.

3. A fishhook device as claimed in claim 1, wherein the lure member comprises a plate, the lure member part comprising a staple member projecting from the plate on the same side as the hook unit, the hook unit part comprising an extension member projecting from the joint, away from the arms, and through the staple member, and detent means is provided to prevent withdrawal of the extension member from the staple member, the detent means comprising a protrusion from one of the plate and the extension member engaging in a slot in the other of the plate and the extension member.

4. A fishhook device as claimed in claim 1, wherein the first arm comprises a leaf spring having a bent end portion joined to the second arm.

5. A fishhook device as claimed in claim 1, wherein the lure member comprises a bait replica of flexible material and an attachment member, the attachment member being attached to the bait replica and comprising said lure member part, such that interengagement of the hook unit part and the lure member part attaches said hook unit to said attachment member.

6. A fishhook, device as claimed in claim 5, wherein the loop comprises a portion of the bait replica formed by piercing the flexible material with the hook on the second arm.

7. A fishhook device as claimed in claim 1, wherein the lure member comprises a bait replica comprising a moulding of flexible material and an attachment member, the attachment member having a first portion embedded into the bait replica as a mould insert and a second portion comprising said lure member part for interengagement with the hook unit part.

8. A fishhook device as claimed in claim 1, wherein the lure member comprises a bait replica of flexible material and an attachment member, the attachment member having a tang extending into the bait replica and a protruding portion comprising the lure member part for interengagement with the hook unit part.

9. A fishhook device as claimed in claim 1, wherein the lure member comprises a bait replica of flexible material and an attachment member, the attachment member having a first portion extending into the bait replica and a second portion comprising the lure member part, and the loop protrudes from the lure member adjacent a trailing end thereof.

10. A fishhook device comprising a hook unit and a lure member releasably fastened together, the hook unit comprising a first arm and a second arm joined together by a joint, one of the first arm and second arm being resiliently pivotable about the joint between a first position in which the first arm extends at an acute angle to the second arm and a second position in which the arms are together, the first arm having a first hook at a distal end thereof and the second arm having a second hook at a distal end thereof, the hooks each comprising a point and a curved portion, the curved portions of the hooks curving towards each other in a plane through a longitudinal axis of the arms such that, with the arms in the first position, the point of the second hook is shielded by the first hook and the point of the first hook is shielded by the lure member and, with die arms in the second position, the point of the second book projects clear of one side of the lure member and the point of the first hook projects clear of the opposite side of the lure member, the lure member having a loop adjacent a trailing end of the lure member, the hook unit and lure member being fastened together by extension of the second arm through the loop and by interengagement of a part of the hook unit adjacent said joint and it part of the lure member spaced from the loop towards a leading end of the lure member, the hook unit being detachable as a unit from the lure member.

11. A fishhook device as claimed in claim 10, wherein the lure member comprises a plate, the lure member part comprising a staple member projecting from the plate on the same side as the hook unit, the hook unit part comprising an extension member projecting from the joint, away from the arms, and through the staple member, detent means being provided to prevent withdrawal of the extension member from the staple member.

12. A fishhook device as claimed in claim 10, wherein the lure member comprises a plate having at one end means for attachment to a fishing line and the lure member part comprises a staple spaced from said one end and a protrusion intermediate the staple and said one end, the hook unit part comprising an extension of the second arm projecting beyond the joint and extending through the staple, the protrusion engaging in a slot in the extension and preventing withdrawal of the extension from the staple.

13. A fishhook device comprising a hook unit and a bait replica of plastics material fastened together by releasable fastener means having a first part and a second part, the bait replica being attached to said hook unit by means of an attachment member having the first releasable fastener part, the hook unit comprising a first arm and a second arm joined together by a joint, one the first arm and second arm being resiliently pivotable about the joint between a first position in which the first arm extends at an acute angle to the second arm and a second position in which the arms are together, the first arm having a first hook at a distal end thereof and the second arm having a second hook at a distal end thereof, the hooks each comprising a point and a curved portion, the curved portions of the hooks curving towards each other in a plane through a longitudinal axis of the arms such that, with the arms in the first position, the point of the second hook is shielded by the first hook and the point of the first hook is shielded by the lure member and, with the arms in the second position, the point of the second hook projects clear of one side of the lure member and the point of the first hook projects clear of the opposite side of the lure member, the hook unit having the second releasable fastener part adjacent the joint.

14. A fishhook device as claimed in claim 13, wherein the second hook protrudes through the bait replica at a position spaced rearwardly of the releasable fastener parts.

15. A fishhook device as claimed in claim 13, wherein the attachment member is permanently attached to the bait replica.

16. A fishhook assemblage comprising a hook unit and a plurality of lure members each releasably attachable individually, to the hook unit, the hook unit comprising a first arm and a second arm joined together by a joint, one of the first arm and second arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the first arm, the third hook curving towards the first arm in a plane through the longitudinal axis, each of the plurality of lure members having a loop and a first releasable fastener part spaced apart longitudinally, the loop towards a trailing end of the lure member and the releasable fastener part towards a leading end of the lure member, the hook unit having a second releasable fastener part adjacent the joint, whereby the hook unit and one of the lure members can be attached together by extension of the second arm through the loop and by cooperation of the first and second releasable fastener parts, such that, with the hook unit and lure member assembled and the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member.

17. A fishhook assemblage comprising a hook unit and a plurality of lure members in the form of bait replicas attachable, individually, by an attachment member to the hook unit, the hook unit comprising a first arm and a second arm joined together by a joint, one of the first arm and second arm being resiliently pivotable about the joint between a first position in which the first arm extends at an acute angle to the second arm and a second position in which the arms are together, the first arm having first and second hooks at a distal end thereof and the second arm having a third hook at a distal end thereof, the hooks each comprising a point and a curved portion, the curved portions of the first and second hooks diverging to respective sides of a longitudinal axis of the hook unit and curving towards the first arm, the third hook curving towards the first arm in a plane through the longitudinal axis, the attachment member having releasable fastener means for cooperating with a releasable fastener part of the hook unit to fasten the attachment means to the hook unit such that, with the arms in the first position, the point of the third hook is shielded by the first and second hooks and the points of the first and second hooks are shielded by the lure member and, with the arms in the second position, the point of the third hook projects clear of one side of the lure member and the points of the first and second hooks project clear of the opposite side of the lure member.

18. A fishhook assemblage as claimed in claim 17, wherein each lure member has a said attachment member secured permanently thereto.

19. A fishhook assemblage as claimed in claim 17, wherein the releasable fastener means comprises a staple and a detent and, the releasable fastener part of the hook unit comprises an extension of the second arm projecting beyond the joint, to extend, when the hook unit and attachment member are assembled together, through the staple and be retained by the detent.

20. A fishhook assemblage as claimed in claim 17, wherein the attachment member comprises a plate having at one end means for attachment to a fishing line and the releasable fastener means comprises a staple spaced from the one end and a protrusion intermediate the staple and the one end, the releasable fastener part of the hook unit comprising an extension of the second arm projecting beyond the joint to extend, when the hook unit and attachment member are assembled together, through the staple and be detained by location of the protrusion in a slot in the extension.

21. A fishhook device comprising a hook unit and a lure member releasably fastened together, the hook unit comprising a first arm and a second arm joined together by a joint, the first arm being resiliently pivotable about the joint between a first position in which the first arm extends at an acute angle to the second arm and a second position in which the arms are together, the first arm having a first hook at a distal end thereof and the second arm having a second hook at a distal end thereof, the hooks each comprising a point and a curved portion, the curved portions curving towards each other in a plane through a longitudinal axis of the arms such that, with the arms in the first position, the point of the second hook is shielded by the first hook and the point of the first hook is shielded by the lure member and, with the arms in the second position, the point of the first hook projects clear of one side of the lure member and the point of the second hook projects clear of the opposite side of the lure member, the lure member and hook unit being fastened together by releasable fastener means comprising a staple member projecting from the lure member and an extension member projecting from the joint, away from the arms, and through the staple member, detent means being provided to prevent withdrawal of the extension member from the staple member.

* * * * *